United States Patent [19]

Gottlieb

[11] Patent Number: 4,779,972

[45] Date of Patent: Oct. 25, 1988

[54] METHOD OF USING A PRISM IN LENS FOR THE TREATMENT OF VISUAL FIELD LOSS

[76] Inventor: Daniel D. Gottlieb, 225 Woodrill Way, Dunwoody, Ga. 30083

[21] Appl. No.: 908,395

[22] Filed: Sep. 16, 1986

[51] Int. Cl.$^4$ ................................................ G02C 7/02
[52] U.S. Cl. ...................................... 351/177; 351/175
[58] Field of Search ................. 351/159, 170, 175, 177

[56] References Cited

U.S. PATENT DOCUMENTS 3,014,405 12/1961 Swikart ........................... 351/170 X
3,423,151 1/1969 White ............................... 351/175
4,288,149 9/1981 Campbell ......................... 351/170
4,581,031 4/1986 Koziol et al. ................. 351/175 X Primary Examiner—John K. Corbin
Assistant Examiner—Scott J. Sugarman
Attorney, Agent, or Firm—Needle & Rosenberg

[57] ABSTRACT

A method is provided for aiding the vision of an individual with a visual field loss. The method is practiced by the steps of mounting a prism with its base in the direction of the visual field loss within one lens of a pair of glasses and an individual wearing the glasses.

13 Claims, 1 Drawing Sheet

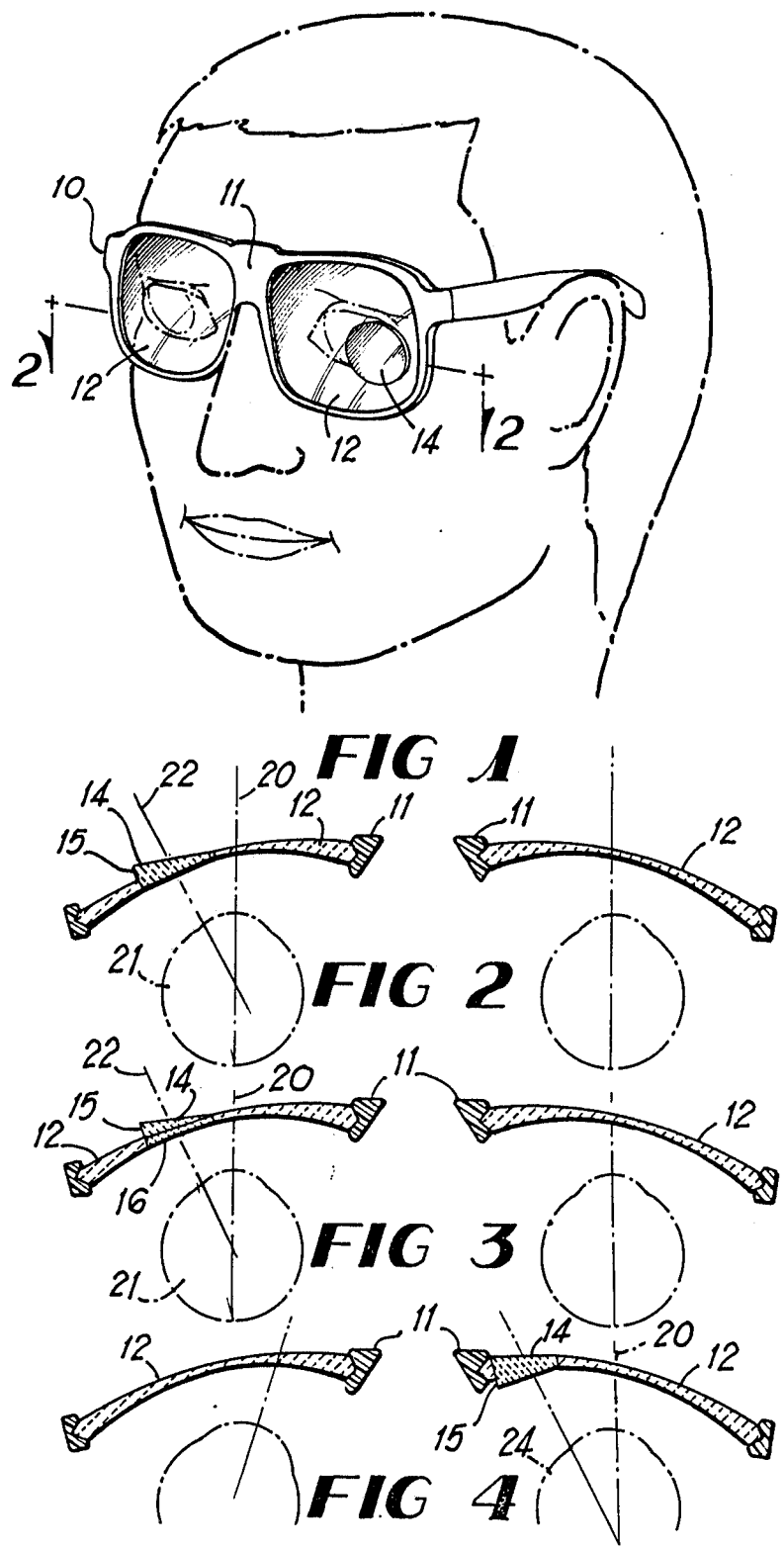

METHOD OF USING A PRISM IN LENS FOR THE TREATMENT OF VISUAL FIELD LOSS

BACKGROUND OF THE INVENTION

This patent relates to the field of rehabilitation of individuals suffering from a visual field loss. More particularly, this invention relates to an improved method of treating patients with visual field losses by using lens systems which incorporate a prism.

Individuals suffering from visual field loss experience severe confusion and disorientation. They find it extremely difficult to remove themselves from the roles of the disabled and lead a productive life. Their diagnosis is visual field neglect, a term used to indicate the inability to make judgments with regard to a localized area of their spacial world. In the case of hemianopsia, this localized area is to the right or left of the patient's spacial world; in altitudinal hemianopsia it is upward or downward. The site of insult along the optic pathway determines the nature of the visual field loss. The most common types of hemianopsia are usually caused by a head injury, cerebral vascular accident, or brain tumor requiring neurosurgery affecting the visual pathway. They can be congruous (identical in size, shape, position and density) or incongruous.

Compensatory techniques which have been considered for the management of visual field defects include the utilization of mirrors, partially reflecting mirrors, reverse telescopes and prisms. Such techniques are discussed in a recent article by Edward Goodlaw, O.D., "Review of Low Vision Management of Visual Field Defects," *Optometric Monthly*, July, 1983, pp. 363-368. Clinical experience has proven that mirrors used to expand the patient's visual field awareness cause significant disorientation and perceptual confusion due to the reversal of images. The use of reversed telescopes is theoretically an approach that will maximize visual field awareness, but experience has shown that utilization of reversed telescopes is not effective in the treatment of hemianopic visual field loss. Furthermore, the mirror and reversed telescope techniques suffer from the fact that they are cosmetically unacceptable to patients.

The use of prisms to treat visual field loss has been previously described by Wayne W. Hoeft, O.D. in *Low Vision* (ed. Eleanor E. Faye; Charles C. Thomas, 1973, pp. 103-113) which shows the use of large prisms placed in front of the lens of a pair of glasses. The use of one prism for each lens is demonstrated in this article. The cosmetic appearance of such a system was cited as a serious problem in patient acceptance of the system.

One proposed resolution to the cosmetic problems of the use of prisms is the use of Fresnel thin wafer prisms, the use of which are described in detail by Randall T. Jose, O.D. and Audrey J. Smith ("Increasing Peripheral Field Awareness with Fresnel Prisms," *Optical Journal and Review of Optometry*, Vol. 113, No. 12, Dec. 15, 1976, pp. 33-37). This article discloses the use of one Fresnel prism placed on the lens.

Our clinical experiences have shown us that the utilization of a Fresnel press-on prism is an ineffective final rehabilitative aid in the management of a patient suffering visual field loss. Patients find these prisms to cause significant loss of contrast due to the poor optical quality as well as the prismatic distortion, all resulting in reduced resolution. Patients also complain of the poor cosmetic appearance and the significant discoloration evident over a short period of time. They often find the Fresnel press-on prism to be a nuisance rather than a help.

For the purposes of this application, "prism" shall be understood to mean a wedge prism (or a portion thereof), specifically excluding Fresnel prism. The base of the prism is its widest portion, or more precisely, the edge of the prism in the direction in which the prism bends or refracts light. On the other hand, the apex of the prism is its narrowest portion.

SUMMARY OF THE INVENTION

The present invention is an improved method of using prisms to treat individuals suffering from visual field loss. This new method will allow for functional and cosmetic improvements as compared to previous treatment methods. It will allow for patient acceptance and utilization whereas, in the past, cosmetics alone were enough to deter patients from using other compensatory techniques.

The method incorporates the use of one or more small, wedge shaped prisms mounted within a single carrier lens. It may be mounted to project inside or outside of a spectacle born single vision or multifocal prescription. Our clinical studies indicate that a 18.5 prism diopter prism is optimum, but that the prism may advantageously be in the range of 5 to 35 prism diopters. Such a prism has exceptional optics without the severe spacial distortion and reduced resolution characteristic of the Fresnel press-on prisms.

A lens system to be used in the invented method may also be designed so that a prescriptive lens button can be placed in apposition to the prism or the prism may be surfaced to itself have power. This ensures that the patient has not only the prism effect, but the appropriate spectacle correction for distant or near viewing while scanning into the prism.

The prism is placed near the edge of the individual's perceived visual field within the area of the visual field loss. By placing the prism within the visual field loss it does not obscure vision on straight ahead gaze. By scanning into the prism (with its base in the direction of the visual field loss) diplopia (double vision) is created in a patient with two seeing eyes. The double vision takes place in the occipital visual cortex of the brain due to the overlapping visual images. The image seen through the prism by one eye is projected over the other eye's visual field. Once an object is perceived and localized, then the individual will be able to turn his head to view fully the object or area of the visual field which was initially seen through the prism. Thus, the prism system is used as a spotting system for awareness and localization, and not as a system used for viewing through on an extended basis.

Furthermore, the lens chosen in which to place the prism may be dependent on additional individual characteristics. For instance, a person with strabismus is one who has only one eye capable of habitually fixating on the intended object. If the non-fixating eye of such a person is the eye nearest the side of visual field loss, it will be necessary to place the prism in the other lens mounted nasally (non-temporally), so that the prism is in front of the fixating eye.

Since the prism is mounted within the lens, both the optical quality and the cosmetic aspect of the system is improved. This is an especially significant improvement in the area of cosmetic appearance, since prior art systems have been unsightly and, therefore, have been subject to significant rejection by individuals. This cosmetic benefit is improved by the option of placing the prism within the lens so that it projects inward rather than outward. In clinical tests, it was found that the performance of individuals with internally versus externally projecting prisms were indistinguishable.

Therefore, it is an object of the present invention to provide a method of improved treatment of visual field loss in which a prism mounted within a lens is used by patients with such losses.

It is a further object of the present invention to provide a method of using prisms mounted within a lens which includes means for refractive vision correction of the images seen through said prism.

It is yet another object of the present invention to provide a method of visual field loss treatment which is cosmetically acceptable.

These and other objects and advantages of the present invention shall become apparent from the following detailed description of the invention when considered in conjunction with the accompanying drawings.

BRIEF DESCRIPTION OF THE DRAWINGS

FIG. 1 is a perspective view of a lens system as utilized in the method of the present invention.

FIG. 2 is a cross-section taken along the lens 2—2 of FIG. 1.

FIG. 3 is a cross-section similar to FIG. 2, showing the prism mounted with an appositional lens button.

FIG. 4 is a cross-section similar to FIG. 2, showing an internally projecting prism mounted in the lens farthest away from the visual field loss.

DETAILED DESCRIPTION OF THE PREFERRED EMBODIMENTS

The invented method is now described in detail with reference to the drawings, wherein like numbers represent like parts throughout the views.

FIG. 1 shows a lens system 10 used in the present invention being worn by an individual. The lens system is basically a normal pair of spectacles, comprising a frame 11 which carries two lens 12. A prism 14 is mounted within one of the lens 12. Although the prism shown is circular, it may be rectangular or other shapes. Furthermore, it should be small enough to allow for normal vision through most of the lens around the prism. However, multiple prisms may be placed in a single lens if necessary for different visual requirements.

The purpose of the prism is to shift a portion of the visual field which lies in the direction of its base into direct view through the prism. The lens system 10 is used in the present invention to be an aid for individuals who have lost the ability to see a full visual field. By appropriately placing the prism near the edge of the individual's perceived visual field when viewing straight ahead, the individual may scan into the prism so that portion of the visual field in the area of visual loss is brought into view. By placing only one such prism in one lens, diplopia is created of the field seen through the prism. Individuals with visual field loss will adjust the double vision caused by scanning into the prism and will then be able to view normally subjects out of their direct visual field by turning their head towards such objects.

Thus, the location of the prism is important so that it is appropriately placed to best accommodate each individual's field loss. In the most common circumstance the prism will be located in the lens closest to the direction of visual field loss. Thus, the placement of the prism 14 shown in FIG. 2, which shows the lenses 12 in a horizontal cross-section, is typical of a lens system used for an individual with a left vision field loss. As illustrated in FIG. 1, the prism 14 is also located to the left, or temporal, side of the straight ahead vision of the left eye. It is mounted within the lens to minimize prismatic distortion and enhance the cosmetic aspect of the system.

While the configurations shown in FIG. 1 for an individual with a left visual field loss, the placement of the prisms may be adjusted for a right or altitudinal field loss by appropriate placement with the base of the prism in the direction of the field loss.

FIG. 2 also shows that the prism 14 is located through the lens 12. This placement of the prism within a lens may be accomplished by methods known in the optical lens manufacturing art. The base 15 of the prism is also directed toward the visual field loss to bring objects located within the area of visual loss into direct view, as previously described. The prism 14 in FIG. 2 is mounted so that it projects outward from the lens. Line 20 shows the straight ahead line of sight of the eye 21. The prism is placed to the left of the individual's visual field when looking straight ahead. Then, by shifting the visual gaze to the left, so that the line of sight is as indicated by line 22, the individual can view through the prism 14 thereby creating double vision and enabling the individual to see the visual field to the left of line 22.

FIG. 3 illustrates a prism and lens system to be used in the present invention, further comprising a corrective lens button 16 in apposition to the prism 14 within the lens 12. The lens button 16 provides a power correction, for instance, for near-sightedness, so that the shifted image in the prism is also in focus and seen clearly. An alternative implementation for providing vision correction is to directly grind the prism so that the correction is provided directly in the prism. In that case, the lens system would appear the same as in FIG. 2, for instance.

FIG. 4 illustrates the arrangement of the prism 14 in the lens 12 to the nasal side of the right eye 24. Such an arrangement is desirable when the individual has only one fixating eye which is not the eye closest to the direction of the visual field loss such as an individual with strabismus. In this case, the prism 14 should be placed in the lens in front of the fixating eye 24, and the prism will be placed to the nasal side of the direct line of vision 20 with the base 15 in the direction of the field loss.

FIG. 4 also illustrates that the prism 14 may be placed in the lens such that it projects to the inside of the lens 12. Such an internal projection of the lens may be accomplished wherever the prism is placed, with the same desirable effects. The internal placement of the prism results in significant improvement in cosmetic appearance, which will result in increased acceptance by the individual of the lens system of the present method.

While the invention has been described in detail with particular reference to the preferred embodiments thereof, it will be understood that variations and modifications can be effected within the spirit and scope of the invention as previously described and as defined by the claims.

What is claimed is;

1. A method for aiding the vision of an individual with a visual field loss comprising:

mounting a prism within one lens of a pair of glasses wherein said prism is mounted with its base in the direction of the visual field loss; and said individual with a visual field loss wearing said glasses.

2. The method of claim 1, wherein said prism is mounted within the lens closest to the direction of visual field loss on the temporal side of the lens for use by an individual whose eye closes to the direction of the visual field loss is capable of habitually fixating.

3. The method of claim 1, wherein said prism is mounted within the lens farthest from the direction of the visual field loss in the nasal side of the lens for a strabismic individual whose eye closest to the direction of the visual field loss does not habitually fixate.

4. The method of claim 1, wherein said prism projects internally to said lens.

5. The method of claim 1, wherein said prism projects externally to said lens.

6. The method of claim 1, which further comprises mounting a corrective lens button in apposition to the prism within said lens.

7. The method of claim 1, which further comprises surfacing of said prism prior to mounting said prism within said lens to provide a corrective power in said prism.

8. The method of claim 1, wherein said prism is within the range of 5 to 35 prism diopters.

9. The method of claim 8, wherein said prism is 18.5 prism diopters.

10. The method of claim 1, wherein said prism is located in the lens such that it is in the area of visual field loss of said individual when looking forward through said lens.

11. The method of claim 10, wherein said prism is located near the edge of the normal visual field within the area of visual field loss.

12. A method for expanding the visual field awareness of an individual with a visual field loss comprising:

mounting a prism within one lens in a pair of glasses such that diplopia is induced in the individual with a visual field loss.

13. The method of claim 12, wherein said prism is mounted such that said induced diplopia comprises an image through said prism of an area in the visual field loss of the individual.

* * * * *